United States Patent
Vincent et al.

(10) Patent No.: US 10,565,378 B1
(45) Date of Patent: Feb. 18, 2020

(54) EXPLOIT OF PRIVILEGE DETECTION FRAMEWORK

(71) Applicant: FireEye, Inc., Milpitas, CA (US)

(72) Inventors: Michael Vincent, Sunnyvale, CA (US); Sai Omkar Vashist, Morgan Hill, CA (US); Jonas Pfoh, Dresden (DE)

(73) Assignee: FireEye, Inc., Milpitas, CA (US)

( * ) Notice: Subject to any disclaimer, the term of this patent is extended or adjusted under 35 U.S.C. 154(b) by 159 days.

(21) Appl. No.: 15/197,661

(22) Filed: Jun. 29, 2016

Related U.S. Application Data

(60) Provisional application No. 62/273,394, filed on Dec. 30, 2015.

(51) Int. Cl.
*G06F 21/56* (2013.01)
*G06F 21/53* (2013.01)
*G06F 9/48* (2006.01)

(52) U.S. Cl.
CPC .......... *G06F 21/566* (2013.01); *G06F 9/4881* (2013.01); *G06F 21/53* (2013.01); *G06F 2221/034* (2013.01)

(58) Field of Classification Search
CPC ...... G06F 21/53; G06F 21/566; G06F 9/4881; G06F 2221/034
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |
| 5,960,170 A | 9/1999 | Chen et al. | |
| 5,978,917 A | 11/1999 | Chi | |
| 5,983,348 A | 11/1999 | Ji | |
| 6,088,803 A | 7/2000 | Tso et al. | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Khoi V Le
(74) *Attorney, Agent, or Firm* — Rutan & Tucker, LLP

(57) ABSTRACT

A non-transitory storage medium having stored thereon logic, the logic being executable by one or more processors to perform operations including comparing a current privilege of a first process with an initial privilege of the first process recorded in a privilege list, and responsive to determining a change exists between the current privilege of the first process and the initial privilege of the first process that is greater than a predetermined threshold, determining the first process is operating with the current privilege due to an exploit of privilege attack is shown.

27 Claims, 12 Drawing Sheets

(56) References Cited

U.S. PATENT DOCUMENTS

| | | | |
|---|---|---|---|
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sorhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,665,139 B1 * | 2/2010 | Szor | G06F 21/554 713/100 |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,464,340 B2 | 6/2013 | Ahn et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 | 9/2013 | Hutton et al. | |

(56) References Cited

U.S. PATENT DOCUMENTS

| | | |
|---|---|---|
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |

(56) References Cited

U.S. PATENT DOCUMENTS

| | | |
|---|---|---|
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0044906 A1* | 3/2004 | England .............. G06F 12/1491 726/18 |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |

(56) References Cited

U.S. PATENT DOCUMENTS

| | | |
|---|---|---|
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0047010 A1* | 2/2008 | Marceau ............ G06F 21/55 726/23 |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0282354 A1* | 11/2008 | Wobber ............ G06F 21/6218 726/26 |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0260050 A1* | 10/2009 | George ............ G06F 21/53 726/1 |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2010/0318569 A1* | 12/2010 | Munday ............ G06F 21/6227 707/783 |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |

(56) References Cited

U.S. PATENT DOCUMENTS

| | | |
|---|---|---|
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220455 A1* | 8/2015 | Chen ............... G06F 12/1408 711/163 |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEExplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

(56) References Cited

OTHER PUBLICATIONS

Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14_.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

*100*

| Image Name | User Name | CPU | Memory (... | Description |
|---|---|---|---|---|
| Acrobat.exe *32 | 2735 | 00 | 35,164K | Adobe Acrobat |
| acrotray.exe *32 | 2735 | 00 | 2,864K | AcroTray |
| AxiomEngine.exe | 2735 | 00 | 19,924K | Intapp Time Engine |
| csrss.exe | | 01 | 11,776K | |
| dagentui.exe | 2735 | 00 | 2,700K | Dagent |
| DTE.exe | 2735 | 00 | 332,860K | Intapp Time |
| dwm.exe | 2735 | 00 | 2,164K | Desktop Window Manager |
| EMET_Agent.exe | 2735 | 00 | 17,648K | EMET_Agent |
| explorer.exe | 2735 | 00 | 33,968K | Windows Explorer |
| explorer.exe | 2735 | 00 | 12,380K | Windows Explorer |
| hkcmd.exe | 2735 | 00 | 3,248K | hkcmd Module |
| igfxpers.exe | 2735 | 00 | 2,496K | persistence Module |
| igfxtray.exe | 2735 | 00 | 2,824K | igfxTray Module |
| MA 4OES.exe *32 | 2735 | 00 | 6,552K | Metadata Assistant 4 Outlook Support |
| msddsk.exe *32 | 2735 | 00 | 12,452K | Mimecast.Services.Windows.Personal |
| OUTLOOK.EXE *32 | 2735 | 00 | 122,084K | Microsoft Outlook |
| PccNtMon.exe | 2735 | 00 | 2,660K | Trend Micro Security Agent Monitor |
| PhSession.exe | | 00 | 2,716K | |
| PhTray.exe *32 | 2735 | 00 | 2,032K | Proxy Host: Tray Icon application |
| smax4pnp.exe *32 | 2735 | 00 | 1,996K | SMax4PNP |
| SnippingTool.exe | 2735 | 01 | 3,868K | Snipping Tool |
| StikyNot.exe | 2735 | 00 | 6,016K | Sticky Notes |
| taskhost.exe | 2735 | 00 | 7,020 | Host Process for Windows Tasks |
| taskmgr.exe | 2735 | 00 | 3,120K | Windows Task Manager |
| WESClient.exe *32 | 2735 | 00 | 39,472K | WESClient |
| winlogon.exe | | 00 | 2,852K | |
| WinScribeMonitor.exe *32 | 2735 | 00 | 4,092K | Rutan PocketMemo Monitor |
| wisptis.exe | 2735 | 00 | 2,804K | Microsoft Pen and Touch Input Comp... |

*FIG. 1*

EXPLOIT OF PRIVILEGE DETECTION FRAMEWORK

CROSS-REFERENCE TO RELATED APPLICATIONS

This application claims the benefit of priority on U.S. Provisional Application No. 62/273,394, filed Dec. 30, 2015, the entire contents of which are incorporated by reference herein.

FIELD

Embodiments of the disclosure relate to the field of cyber security. More specifically, embodiments of the disclosure relate to a system for detecting "exploit of privilege" attacks.

GENERAL BACKGROUND

Today, computer systems may execute a plurality of processes in a concurrent manner. Each process is granted a set of privileges at the time the process is created and these privileges may change over the life of the process. Typically, the set of privileges granted to a process is stored in a token structure associated with each process. In a computing device with a Windows® operating system, for example, each token structure is "unique" to a process within the run-time environment in that there is a one-to-one mapping between the process and its associated token (and its included privileges set), and this is established through a kernel object stored in system memory.

However, recently, exploits have been developed that seek to take advantage of vulnerabilities which enable the exploit to modify the privilege of a process and thereafter use the process for unintended purposes. Specifically, exploits may attempt to steal a token of a first process and associate a second process with the stolen token. A second exploit may involve modifying the token structure of a process to alter the set of privileges granted to the corresponding process. For example, an exploit may modify the token structure of a first process by granting the first process additional privileges that were not intended to be obtained by the process.

By the modification of the set of privileges, either by associating one process with the token of another process or by modifying the token structure of a process, the exploit may cause the process to perform unwanted or malicious behavior using the modified privileges. For example, the process having a modified set of privileges may delete or alter one or more files to which the process was not intended to have access. Additionally, a process having a modified set of privileges may open a communication line to a foreign server and download unwanted or malicious payloads. Such exploits may be referred to as exploit of privilege (EoP) attacks, or privilege escalation attacks.

A computer system manages operations performed by each process according to the set of privileges granted to each process. Therefore, when the privileges of a process have been modified, a computer system may unknowingly enable a process to perform operations that the process should be restricted from performing. Additionally, these operations may appear routine or harmless to current malware detection systems. Therefore, detection of EoP attacks present challenges to current malware detection systems.

BRIEF DESCRIPTION OF THE DRAWINGS

Embodiments of the invention are illustrated by way of example and not by way of limitation in the figures of the accompanying drawings, in which like references indicate similar elements and in which:

FIG. 1 is an illustration of a sample process list.

DETAILED DESCRIPTION

Figure 2:
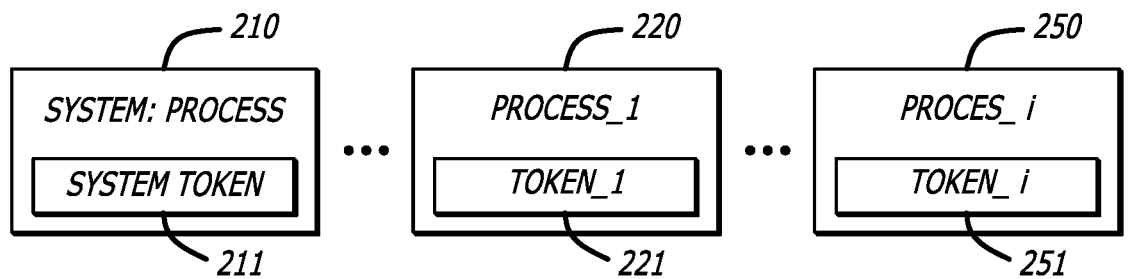
FIG. 2 is an exemplary block diagram illustrating a plurality of processes each being associated with a token in a one-to-one mapping.

Various embodiments of the disclosure relate to an exploit of privilege (EoP) detection system that improves detection of attacks targeting vulnerabilities that allow for an exploit of a privilege of one or more processes. As discussed above, an EoP attack may include the execution of an exploit that takes advantage of a vulnerability, e.g., a vulnerability in software, by modifying a privilege of a process. Such privilege modification may be accomplished by modifying the token associated with the process, associating a token of a first process with a second process (e.g., "steals a token"), and/or causing a first process to create a second process having greater privilege than the first process. The EoP detection system provides the ability to detect an EoP attack by using one or more detection methods.

The EoP detection system may detect a potential EoP attack through a scanning detection method, an explicit detection method, and/or an implicit detection method. In one embodiment, the scanning detection method compares the privileges of each of the processes running at a particular point in time ("current privileges") with a list of privileges of each process when each process was created (as set forth in a "privilege list") or at a later point in time selected so as to assure the "trustedness" (i.e., not altered by malware) of the privilege information. For this, the system stores and/or has access to the privilege list for each process for use in the scanning method. The scanning may be repeated from time to time during execution of each of the process being scanned. In some implementations, each scanning may involve comparing the current privilege at times $t_1$, $t_2$, $t_3$ to $t_n$ with an initial privilege at time $t_o$ creation time for a process, or may involve comparing the current privilege at time $t_1$ with the initial privilege at time $t_0$ and then comparing the current privilege at times $t_2$, $t_3$ or to $t_n$ a prior current privilege that has already been checked and found to match the initial privilege. In this regard, where the privilege of a process has been subject to a later "authorized" change in privilege level (e.g., authorized by a user or administrator or otherwise and not malicious), the initial privilege for comparison may be the new privilege level after the change. The scanning detection method may utilize aperiodic or periodic scanning of a list of processes running on a machine at a particular point in time ("running process list"). The scanning may be done according to a periodic schedule such that the EoP detection system performs the scanning detection method at predetermined periodic time intervals. Alternatively, the scanning detection method may be performed according to other triggering events that occur in an aperiodic manner ("aperiodic triggering events"). For example, an aperiodic triggering event may be the calling of a predetermined number of function and/or system calls by processes running on the machine. Additionally, an aperiodic triggering event may be an input from a user or network administrator.

In a second embodiment, the scanning detection method may compare the running process list with a "learned privilege list." The learned privilege list is a list of one or more processes and one or more privilege(s) corresponding to each process, wherein the one or more privilege(s) were known prior to the time of the scanning as a result of prior analyses and/or experimentation (e.g., experiential knowledge). For example, a web browser application may have two running processes: a first process running with the privilege(s) of the user, and a second process running with a second set of privileges (e.g., a default set of privileges, wherein the default set of privilege is included on the learned privilege list). When the scanning detection method (or another detection method disclosed herein) detects that the second process has gained privilege(s) beyond those appearing on the learned privilege list, the EoP detection system may enter the detection phase to determine whether the second process is operating with a stolen token or a maliciously modified token. In another embodiment, when the scanning detection method (or another detection method disclosed herein) detects that the second process has gained privilege(s) beyond those appearing on the learned privilege list, the reporting logic of the EoP detection system may automatically report that the second process is operating with a stolen token or a maliciously modified token.

When the current privilege(s) of a first process are inconsistent with the privilege(s) listed (e.g., listed) for the first process on the privilege list, reporting logic of the EoP detection system analyzes the current privilege(s) of the first process to determine whether the first process is operating with a stolen token or whether the token of the first process has been modified maliciously. Herein, a malicious modification of a token may be interpreted as the modification of the privilege set forth in the token such that the privilege provided in the modified token is greater than the privilege set forth in the original token and the modified privilege is inconsistent with expectations for variations of the privilege of the process with which the token is associated. Expected or "authorized" changes in privilege level may be effected by a trusted system service such as, for example, upon a software update or other event as contemplated or even prompted by a user or administrator and stands in contradistinction to a malicious modification. The expectations for variations of a privilege (e.g., an increase in the privileges of a process) may be based on, inter alia, the type of process (e.g., a browser process, a host process for operating system (OS) tasks, an email client, etc.), and/or the initial privilege(s) of the process. Herein, the term "privilege(s)" may be interpreted as comprising a privilege level associated with a process. For example, a process may have a privilege level of 'X,' wherein 'X' comprises a plurality of individual privileges.

Additionally, the scanning detection method may also compare identification information of the token of a first running process with (i) identification information of the token of one or more running processes, and/or (ii) identification information of the token of the first process set forth in the privilege list (e.g., the identification information of the token of the first process at the time the first process was created). The comparison of identification information of one or more tokens enables the EoP detection system to detect when a process is operating, for example, with a stolen token. A stolen token may represent a token that is no longer associated with a process in a one-to-one mapping, but is instead associated with a plurality of processes in a one-to-many mapping. In one embodiment, the identification information of a token may be a pointer to a location in memory. In a "clean," e.g., non-altered or non-maliciously altered, system, each process in these embodiments is associated with an unaltered or non-maliciously altered token in a one-to-one mapping; therefore, no two processes should point to the same location in memory. The privilege list, as discussed above, may also include the identification information of the token associated with each process. Identification information of a process may include, inter alia, a process identifier, a process name, a process description, or any other descriptor.

In a second embodiment, the scanning detection method may compare the identification information of each token of each running process with the identification information of each token of one or more predetermined processes to determine whether a currently running process is operating with a stolen token. For example, the predetermined processes may include one or more system processes. The EoP detection system may analyze each process on the list of currently running processes by comparing the identification information of the token associated with a first process with the identification information of the token of each of the predetermined processes. The EoP detection system may analyze each of the currently running processes in this manner. When the EoP detection system detects a match between the identification information of the token of a first currently running process and the identification information of the token of one of the predetermined processes, the EoP detection system has detected that the first currently running process is operating with a stolen token and may generate an alert detailing such information.

The explicit detection method may intercept or trap, sometimes referred to as "hook," a software call (e.g., API, library, procedure, function, or system call) appearing on a list of predetermined calls such as system calls (e.g., a request by the process to the kernel of the OS running on the machine) and/or function calls (e.g., a call to a subroutine within the program of which the process making the function call is an executing instance). Herein, the term "hooked" may involve, for example, intercepting or otherwise monitoring a software call or other software activity, such that the EoP detection system, may analyze the call or behavior. In some "in band" embodiments, the analysis may occur prior to or after, for example, servicing (responding to) the software call while other embodiments may operate out of band so as to avoid interruption or introduced delay in execution. In particular, the EoP detection system may analyze the privilege(s) required to make the hooked call and determine whether the privilege(s) required to make the call are consistent with the privilege(s) listed for the process on the privilege list. As discussed above with the scanning detection method, when the privilege(s) required to make the hooked call are inconsistent with the privilege(s) listed for the process on the privilege list, the reporting logic of the EoP detection system analyzes the current privilege(s) of the process to determine whether the process is operating with a stolen token or whether the token of the first process has been maliciously modified.

The implicit detection method may hook into the kernel scheduler and trap on the scheduling of the pending thread of execution. Herein, by hooking the kernel logic (e.g., one or more software calls directed to the kernel) that schedules a thread, the EoP detection system may analyze whether the privilege(s) of one or more of the threads of interest that are scheduled to run are greater than the privilege(s) appearing on one or more of (i) the privilege list or (ii) the learned privilege list (herein the learned privilege list may also include information associated with one or more threads and the privilege(s) of each thread, if applicable). When the privilege(s) of a first thread are greater than expected the privileges of the first thread, the reporting logic of the EoP detection system may report a stolen token or a token that has been maliciously modified based on the analyses.

The implicit detection method may alternatively, in some embodiments, be implemented in a hypervisor virtualization layer provided for use by the EoP detection system, and trap on the scheduling of a thread to execute software. Herein by trapping within the hypervisor all or any threads of interest, the EoP detection system may analyze whether the privilege(s) of the thread scheduled to run are greater than the privilege(s) appearing on one or more of (i) the privilege list or (ii) the learned privilege list. When the privilege(s) of a first thread are greater than expected the privileges of the first thread, the reporting logic of the EoP detection system may report a stolen token or a token that has been maliciously modified based on the analyses.

Herein, the EoP detection system may utilize one or more of the detection methods briefly discussed above to detect malware directed at an EoP attack, wherein "malware" may be broadly construed as including exploits that initiate malicious, anomalous or unwanted behaviors.

Additionally, the EoP detection system may detect the presence of malicious binaries exploiting, or attempting to exploit, the privilege(s) of one or more of their own processes or other processes on the system. A malicious binary may enter the system, e.g., through a download and attempt to infiltrate a network or target device. In some embodiments, the malicious binary, upon execution, will attempt to purposefully cause a change in privilege(s) of one or more processes and use the changed privilege for a malicious purpose, such as accessing secured memory locations to obtain personal or confidential data, or spread throughout a network.

In one embodiment of the disclosure, the EoP detection system includes one or more processors, a communication interface, a persistent storage storing thereon a dynamic analysis logic, an optional static analysis logic, and an alert generation logic. Such an EoP detection system may be implemented in a network device including, but not limited to, an endpoint such as a general-purpose or special-purpose network device. Alternatively, or in addition, the dynamic analysis logic may include one or more virtual machines (VMs) and a virtual machine manager (VMM) wherein the EoP detection system operates within the one or more VMs and the VMM. Such dynamic analysis logic may be implemented by a cyber-threat detection appliance including the EoP detection system, for example. Such an appliance can be a purpose-built cyber-threat detection network device or a general-purpose network device configured with an executable computer program furnishing the EoP detection system.

Herein, the EoP detection system may be implemented in each instance of a VM within the dynamic analysis logic. Alternatively, the EoP detection system may be implemented entirely within the VMM such that the EoP detection monitors the processing within each VM of the dynamic analysis logic. In yet another embodiment, the logic of the EoP detection system may be implemented in both of (i) the VMM, and (ii) each VM of the dynamic analysis logic. In such an embodiment, each VM may include logic providing the full functionality of the EoP detection system, or one or more functionalities (e.g., operations), but less than all, may be provided to each VM, wherein the VMM would include logic providing, at least, the functionalities not provided to each VM. In yet another embodiment, each VM and the VMM may include logic providing full functionality of the EoP detection system, wherein the results of the EoP detection system monitoring a particular VM from the VMM may be compared with the results of the EoP detection system within the particular VM. Additionally, a VM and the VMM may collaborate in the operations performed by the EoP detection system by transmitting data and/or results between the EoP detection system logic included in the VM and the EoP detection system logic included in the VMM. In yet another embodiment, one or more functionalities performed by the EoP detection system logic within the VM and/or the VMM may be disabled and/or enabled dynamically through one or more electronic signals transmitted by, for example, a network administrator during configuration and instantiation of the VM or, in some embodiments, during VM runtime.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list to cloud storage without receiving permission from the user.

The term "processing" may include launching an application wherein launching should be interpreted as placing the application in an open state and performing simulations of actions typical of human interactions with the application. For example, the application, an Internet browsing application may be processed such that the application is opened and actions such as visiting a website, scrolling the website page, and activating a link from the website are performed (e.g., the performance of simulated human interactions).

The term "network device" may be construed as any electronic device with the capability of connecting to a network, downloading and installing mobile applications. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc. Herein, the terms "network device," "endpoint device," and "mobile device" will be used interchangeably. The terms "mobile application" and "application" should be interpreted as software developed to run specifically on a mobile network device.

The term "malicious" may represent a probability (or level of confidence) that the object is associated with a malicious attack or known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during processing in one or more VMs, (vi) attempts to access memory allocated to the application during virtual processing, and/or other factors that may evidence unwanted or malicious activity.

The term "process" may be interpreted as an executing instance of a computer program. As is known in the art, a process may consist of one or more threads. The term "thread" should be interpreted as an execution of the smallest sequence of instructions that is managed by a scheduler.

The term "token" (or "primary access token") may be interpreted as an object (e.g., information formatted in a specified structure) that describes the security context of a process or thread associated with the token, wherein one or more thread(s) of the process perform various actions on the behalf of the user that the token represents. The token may be thought of as a badge or identification (ID) of the user account to which the process, and thus any threads associated therewith, belongs. The token may be utilized within the OS to implement security principles of controlled access and isolation.

In one embodiment, the token may have a predetermined structure that is known to both the operating system and the EoP detection system (e.g., the predetermined structure may be advertised to parties other than the operating system developer). In a second embodiment, the token may have a predetermined structure wherein the predetermined structure is shielded from parties other than the operating system developer (i.e., such a token may be referred to as an opaque token). In the second embodiment, the operating system may shield the structure of the token from processes or application by merely requiring a process and/or thread pass the token to the operating system when making a function and/or system call.

In either embodiment, the information comprising the security context in a token may include, inter alia, the identity of the user account associated with the process or thread, identifiers of the groups to which the user is a member, session information, and the privilege(s) of the user and/or groups to which the user is a member. Herein, a privilege is an access right of a process or thread that allows the process or thread to perform various operations on behalf of the user represented by the token. A privilege may relate to the access-control and/or auditing mechanism utilized by operating systems to provide security and isolation. As used herein, the term "privilege" may represent a privilege level, such as, for example, "User," "Admin," or "System," or represent an individual privilege, such as, for example, "SeCreatePagefilePrivilege."

Additionally, the term privilege may be interpreted as the security context of the process, or its thread(s), which is executing on behalf of the user account specified by the primary access token. In some embodiments, individual threads of a process may act on the behalf of other users through the related "impersonation tokens." In one embodiment, the term "token" may mean the "primary access token" and/or the "impersonation token."

As an example, a malicious kernel exploit may involve overwriting the data stored in memory locations associated with the sub-structure containing the privileges of the opaque token associated with a process. Thus when a user directs the process to perform an operation, the process, which previously had a first privilege, now has an escalated second privilege due to the malicious memory overwrite of the data stored in the sub-structure of the opaque token associated with the process.

Embodiments of the disclosure provide illustrative examples of a Microsoft® EoP detection system employing a Windows® operating system and are not meant to limit the scope of the application. Alternative operating systems such as Linux™ (e.g., a UNIX or Unix-like operating system) and Mac OS X have different security model implementations as compared to Windows. Whereas on the Windows operating system, the "token" is an opaque object that stores and maintains the user security context for each process, Linux™ utilizes two primary credentials: creator user credentials and primary user credentials. UNIX and Linux also has the concepts of effective creator and primary credentials to provide security and isolation. These are internally implemented on Linux as opaque kernel structures. Additionally, Mac OS X may add "entitlements" (sand-boxing) and "code-signing" to restrict the actions and activities that a process running on behalf of users are able to perform. On Mac OS X, the entitlements are implemented through a mandatory access control (MAC) layer. For example, a MAC policy (e.g., a security policy that may restrict the ability of a user to deny or grant access to resources in a system) may be implemented as an opaque kernel structure. Thus, the same types and categories of kernel exploits apply to operating systems other than Microsoft® Windows® operating system, and it is envisioned that the detection techniques disclosed herein apply to each of these operating systems.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting exploit of privilege attacks. As this invention is susceptible to embodiments of many different forms, it is intended that the present disclosure is to be considered as an example of the principles of the invention and not intended to limit the invention to the specific embodiments shown and described.

II. Network Appliance Deployment

The EoP detection system may operate in accordance with three phases: (i) a build phase, (ii) a detection phase, which includes one or more of the scanning detection method, the explicit detection method, and/or the implicit detection method, and (iii) a reporting phase. The build phrase may include the generation of a privilege list, which should be interpreted as a list or other data structure of the privilege(s) of each process at the time each process was created (and, in some cases, reflecting later authorized modifications). The detection phase, as mentioned above, may include one or more detection methods. The detection phase may implement one or more of the methods, and in some embodiments, may implement all three detection methods. Additionally, the EoP detection system includes a reporting phase which analyzes the results of the detection phase to determine whether the current privilege(s) of a first process that are inconsistent with the privilege(s) present on the privilege list for the first process are due to operation using a stolen token or the malicious modification of the token associated with the first token.

1. Build Phase

Referring to FIG. 1, an illustration of a sample process list is shown. The sample process list 100 of FIG. 1 displays all of the processes running a particular point in time (e.g., within a virtual machine of the EoP detection system). The process list 100 illustrates a plurality of processes running on a machine and includes information for each of the processes including one or more of: User Name (of the user logged into the machine), the percentage of the CPU used by the process, the amount of memory used by the process, and a description of the process.

Referring to FIG. 2, an exemplary block diagram illustrating a plurality of processes each being associated with a token in a one-to-one mapping is shown. The block diagram illustrates one embodiment of a relationship between the processes of system (e.g., running in a virtual machine of the EoP detection system, or as in the embodiment discussed within the "endpoint device deployment" below) and the token associated with each process. FIG. 2 illustrates that each process of a plurality of processes is associated with a token in a one-to-one mapping. For example, the system token 211 associated with the system process 210 is different than the Token_1 associated with Process_1 and the Token_2 associated with the Process_2 is different than the system token and the Token_1. A computer system may include a plurality of processes including one or more System processes and one or more processes (Process_1-Process_i, i≥1). The illustration of FIG. 2 may construed as being a "clean" computer system wherein no tokens have been stolen or modified.

Figure 3:
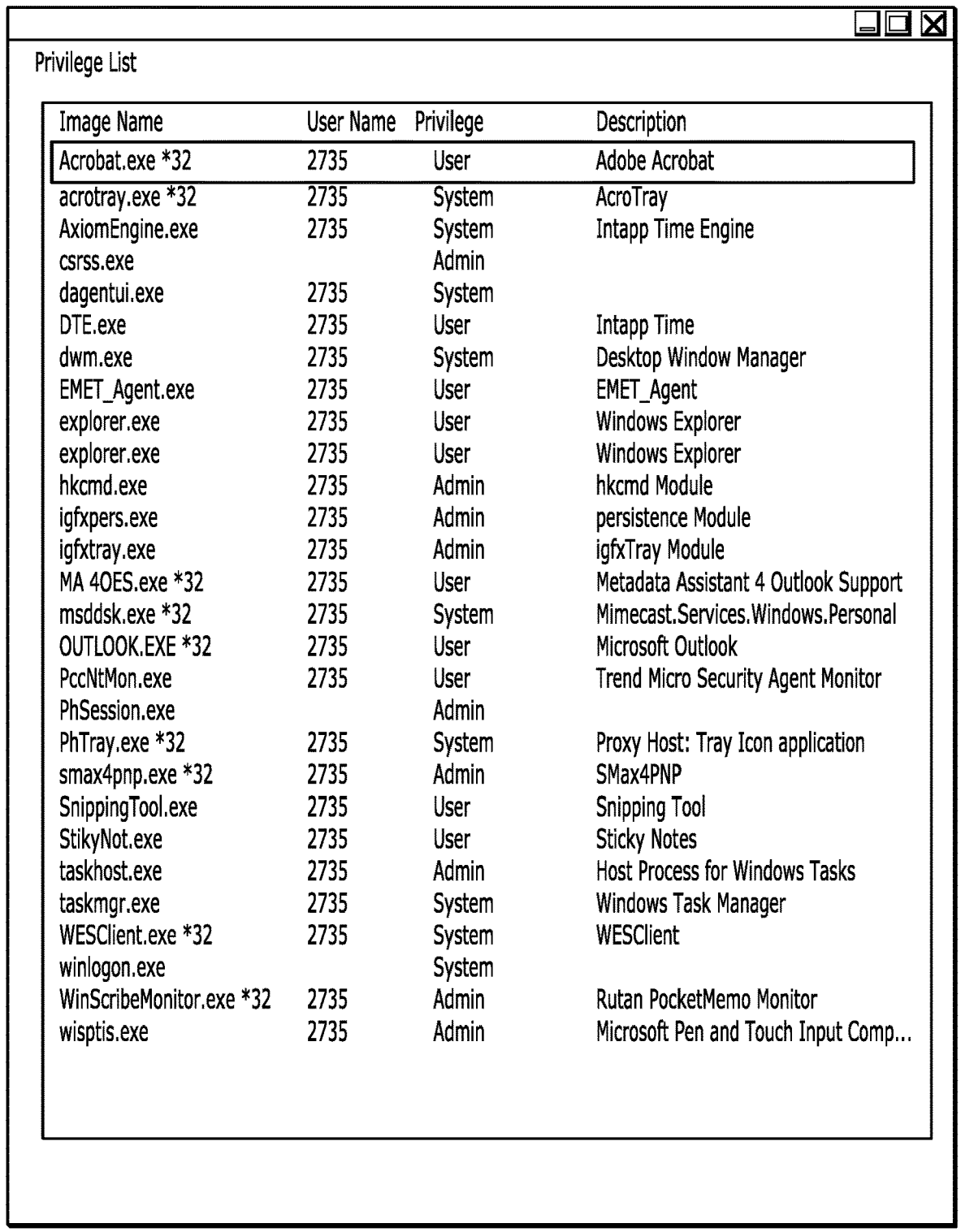
FIG. 3 is an illustration of a sample privilege list generated according to the sample process list of FIG. 1.

Referring to FIG. 3, an illustration of a sample privilege list generated according to the sample process list of FIG. 1 is shown. The sample privilege list 300 of FIG. 3 displays a privilege level of each of the running processes running at a particular point in time. The privilege list 300 corresponds to the process list 100 of FIG. 1. The embodiment of FIG. 3 illustrates the use of three privilege levels: User, Administrator (Admin), and System. In one embodiment, the privilege level of User may have the least amount of privilege, the privilege level of Admin may have more privilege than the privilege level User and the privilege level System may provide the most privilege. In other embodiments, the privilege levels may take alternative names or may be ordered differently in terms of an amount of privilege each level provides. In yet other embodiments, additional privilege levels may be included (e.g., an operating system may allow for more than three levels of privilege). Alternatively, an operating system may allow for less than three levels of privilege.

Figure 14:
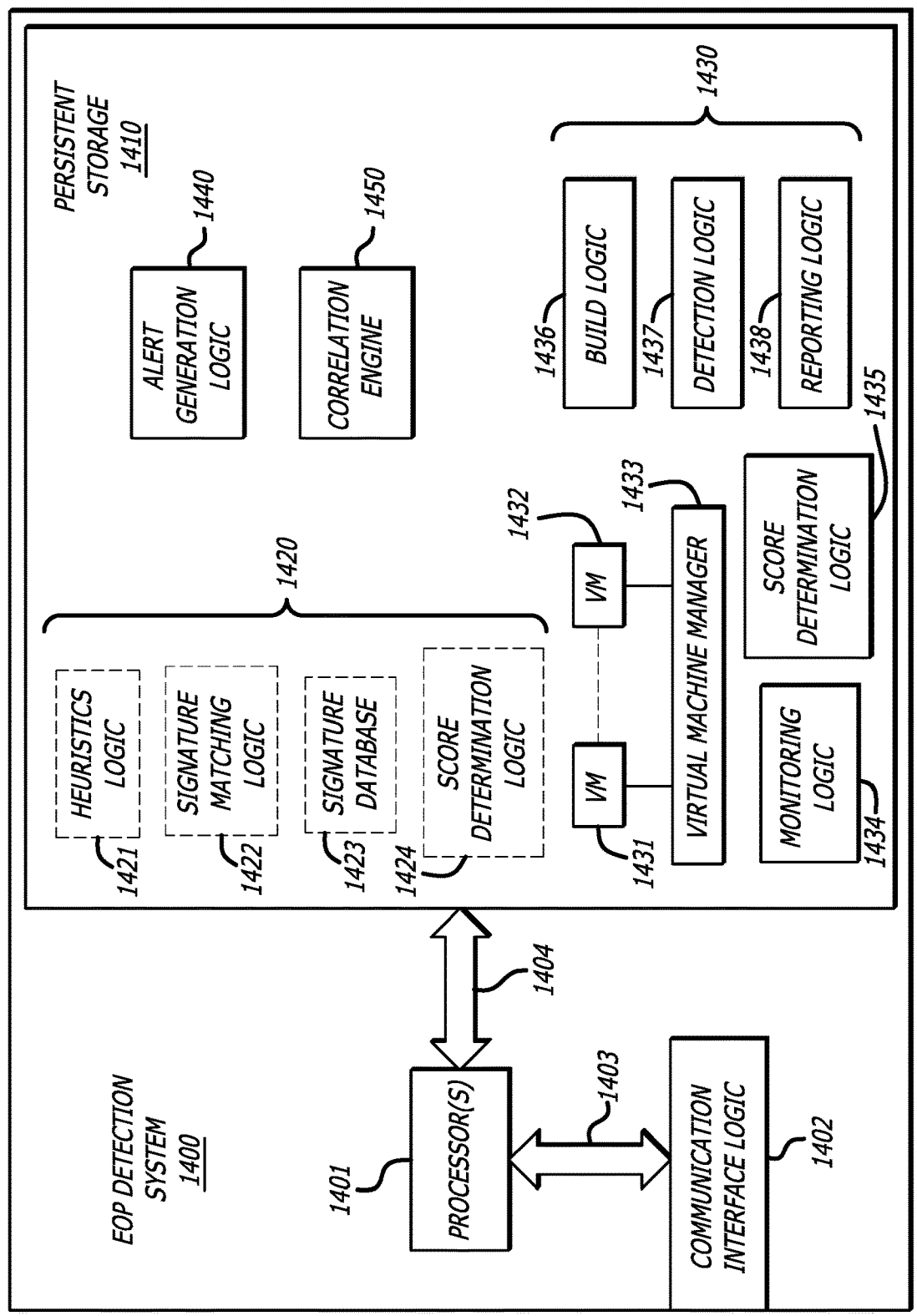
FIG. 14 is an exemplary embodiment of a logical representation of an exploit of privilege detection system.

As seen in FIG. 14, the build logic 1436 within the dynamic analysis engine 1430 of the EoP detection system 1400 may be the logic component of the EoP detection system 1400 that analyzes a newly created process and records identification information of the process, identification information of the token associated with the process, the privilege(s) of the process, etc.

2. Detection Phase

Figure 4A:
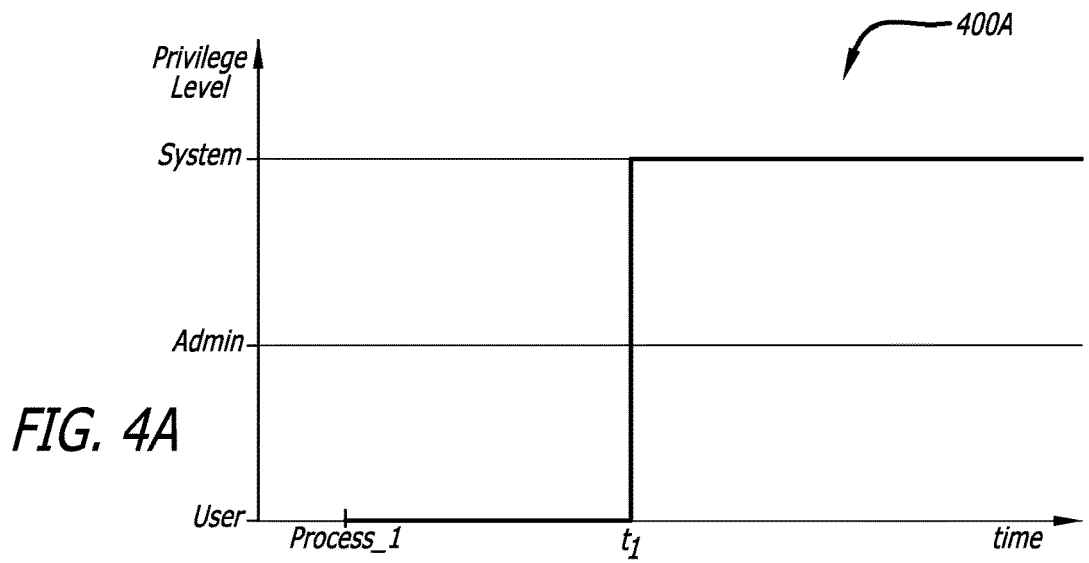
FIG. 4A is a first graph illustrating a change in privilege levels of a process over time.

Referring to FIG. 4A, a first exemplary graph illustrating a change in privilege level of a process over time is shown. The graph includes a first axis representing time and a second axis representing privilege level such that the graph illustrates a change in the privilege level of Process_1 over time. FIG. 4A illustrates a possible scenario that the EoP detection system would detect. As is illustrated, Process_1 is created having User privileges. However, at time $t_1$, Process_1 may accumulate privileges such that Process_1 obtains a privilege level of System. The EoP detection system may detect the change in privilege via any of the detection methods implemented.

Figure 4B:
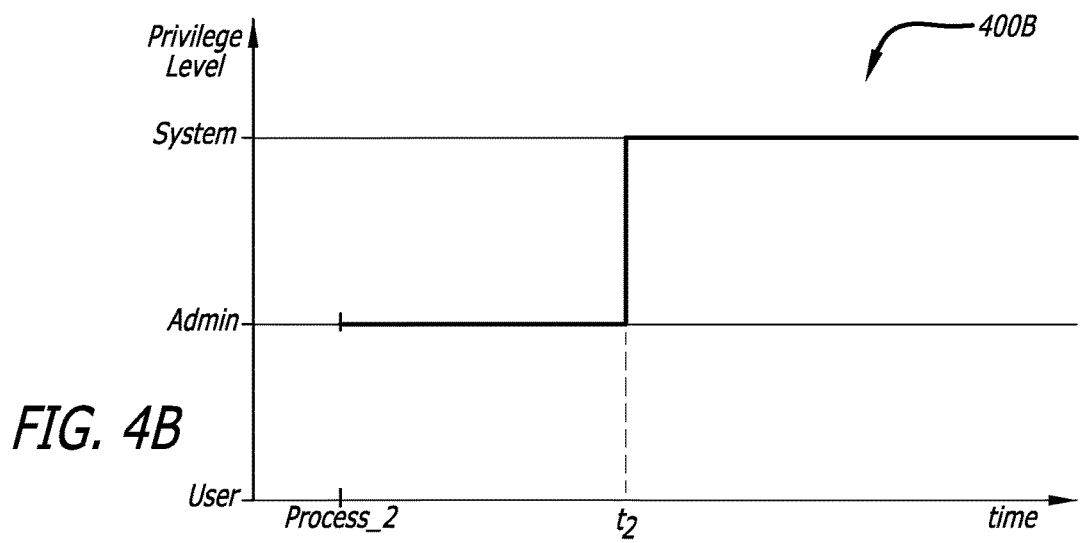
FIG. 4B is a second graph illustrating a change in privilege levels of a process over time.

Referring to FIG. 4B, a second exemplary graph illustrating a change in privilege level of a process over time is shown. The graph includes a first axis representing time and a second axis representing privilege level such that the graph illustrates a change in the privilege level of Process_2 over time. As is illustrated, Process_2 is created having administrative privileges. However, at time $t_2$, Process_2 may accumulate privileges such that Process_2 obtains a privilege level of System. The EoP detection system may detect the change in privilege via any of the detection methods implemented.

Figure 4C:
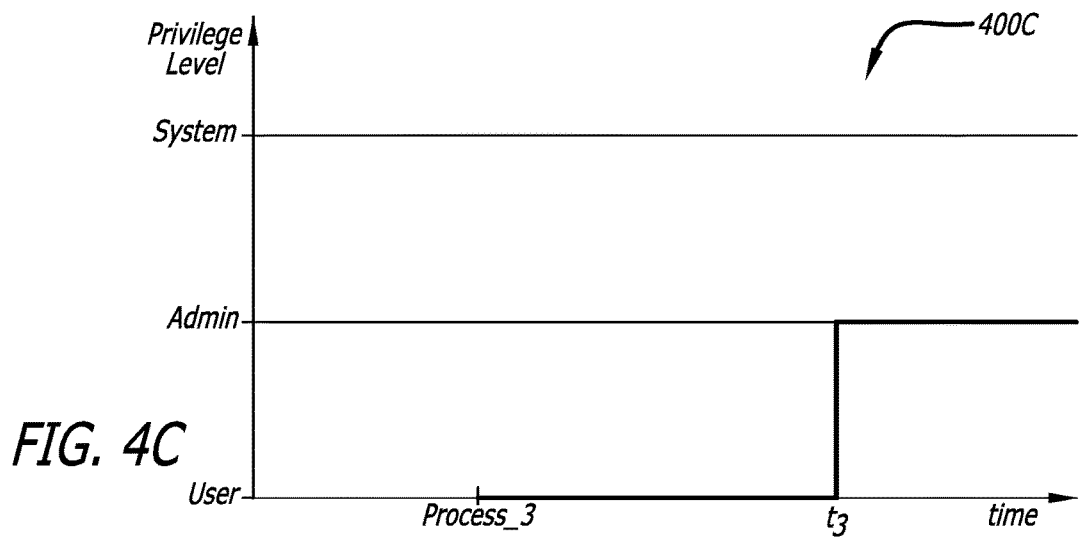
FIG. 4C is a third graph illustrating a change in privilege levels of a process over time.

Referring to FIG. 4C, a third exemplary graph illustrating a change in privilege level of a process over time is shown. The graph includes a first axis representing time and a second axis representing privilege level such that the graph illustrates a change in the privilege level of Process_3 over time. As is illustrated, Process_3 is created having User privileges. However, at time $t_3$, Process_3 may accumulate privileges such that Process_3 obtains a privilege level of Admin. The EoP detection system may detect the change in privilege via any of the detection methods implemented. Additionally, the EoP detection system may detect changes in privilege from System to Admin, System to User and Admin to User.

The EoP detection system may also be utilized to detect destructive privilege attacks. For instance, a malicious exploit or a malware attack (e.g., a malicious attack) may attack an anti-virus or security software by modifying the privilege(s) of the anti-virus or security software before proceeding with additional malicious or unwanted behavior. Specifically if the malicious attack is able to reduce the privileges of a privileged system service (e.g., the anti-virus or other security software), the malicious attack may be able to render the privileged system service useless. Alternatively, the malicious attack may tamper with the privileges associated with update agents, or modify file or registry key privileges so that regular security updates are disabled, or are unable to run successfully.

In one embodiment, the EoP detection system may detect a modification in a token through a detection of an insertion of a flag within one or more fields within the token associated with a process resulting in the disablement or modification of the field(s). For example, a "DENY" flag may be used to disable a particular privilege field within a token such that the process may be prevented from utilizing the privilege associated with the modified or flagged field. A malicious attack may direct its attack by attempting to disable one or more privilege fields of a privileged system service thereby essentially disabling one or more features of the privileged system service by modifying its privilege (e.g., lowering its privilege and/or disabling one or more privileges such that the privileged system service can no longer perform malware or exploit detection operations).

In one embodiment, the EoP detection system may detect the change in privilege level from User to Admin through the scanning detection method during the detection phase. In a second embodiment, the EoP detection system may detect the change in privilege level from User to System, and in a third embodiment, the EoP detection system may detect the change in privilege level from Admin to System. Specifically, when Process_1 is initially created, the EoP detection system add Process_1 having a privilege level of User on the privilege list, as discussed above in accordance with FIG. 1. During a scan of the process list at, for example, time $t_1$ (when privilege level is Admin), the EoP detection system would detect that the privilege level of Process_1, Admin, is inconsistent with the privilege level recorded on the privilege list for Process_1. Upon such a detection, the reporting phase of the EoP detection system detection methodology would be initiated to analyze the inconsistency of the privilege level of Process_1 between the time at which Process_1 was created and time $t_1$.

In other embodiments, the EoP detection system may detect the change in privilege level of Process_1 via either the explicit detection method or the implicit detection method. As will be discussed below, in a first embodiment, the EoP detection system may detect the change in privilege level using the explicit detection method when Process_1 makes a hooked function call. For example, the EoP detection system may hook one or more predetermined function calls such that when a process makes one of the hooked function calls, the EoP detection system may then perform one or more of its detection methods. In a second embodiment, the EoP detection system may detect the change in privilege level using the implicit detection system by detecting the scheduling of a thread by Process_1, wherein the thread has a privilege level of Admin or System.

Figure 5:
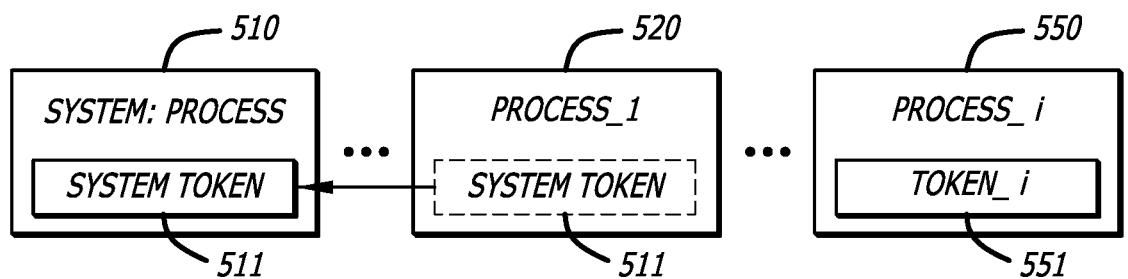
FIG. 5 is an exemplary block diagram illustrating the plurality of processes of FIG. 1 wherein a process is operating with a first stolen token.

Referring to FIG. 5, an exemplary block diagram illustrating the plurality of processes of FIG. 1 wherein a process is operating with a first stolen token is shown. In contrast to the "clean" system illustrated in FIG. 1, the block diagram illustrates one embodiment in which Process_1 is operating with a stolen token such that Process_1 has a privilege level of System. As illustrated herein, a stolen token may be interpreted as a token associated with a first process (e.g., "system token" associated with "system_process") and is subsequently utilized by a second process (e.g., "system token" utilized with "Process_1"), which is not a child process of the first process. Instead, the second process provides a link to the token of the first process when providing proof of privilege when, for example, making a function or system call.

Figure 6:
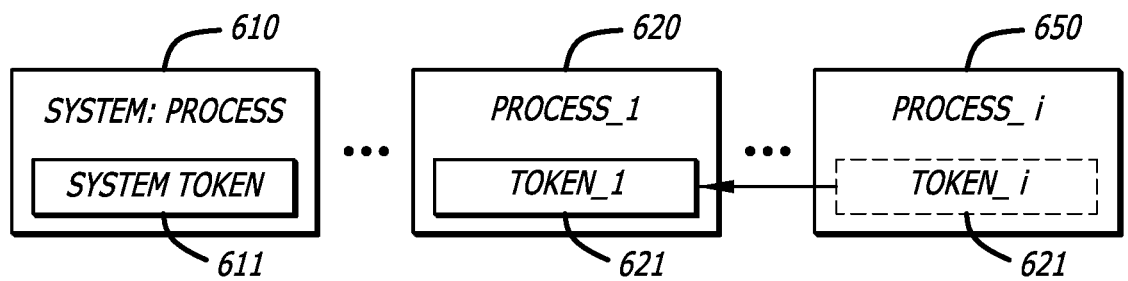
FIG. 6 is an exemplary block diagram illustrating the plurality of processes of FIG. 1 wherein a process is operating with a second stolen token.

Referring now to FIG. 6, an exemplary block diagram illustrating the plurality of processes of FIG. 1 wherein a process is operating with a second stolen token is shown. In contrast to FIG. 5, the block diagram of FIG. 6 illustrates an embodiment in which Process_i is operating with a stolen token, the token being associated with Process_1. The EoP detection system is more likely to encounter the embodiment illustrated in FIG. 5 as tokens of System processes, having a privilege level of System, typically persistent for the life of the session of the user (e.g., the time a user remains logged into the machine) while non-System processes may have a much shorter lifespan.

Figure 7:
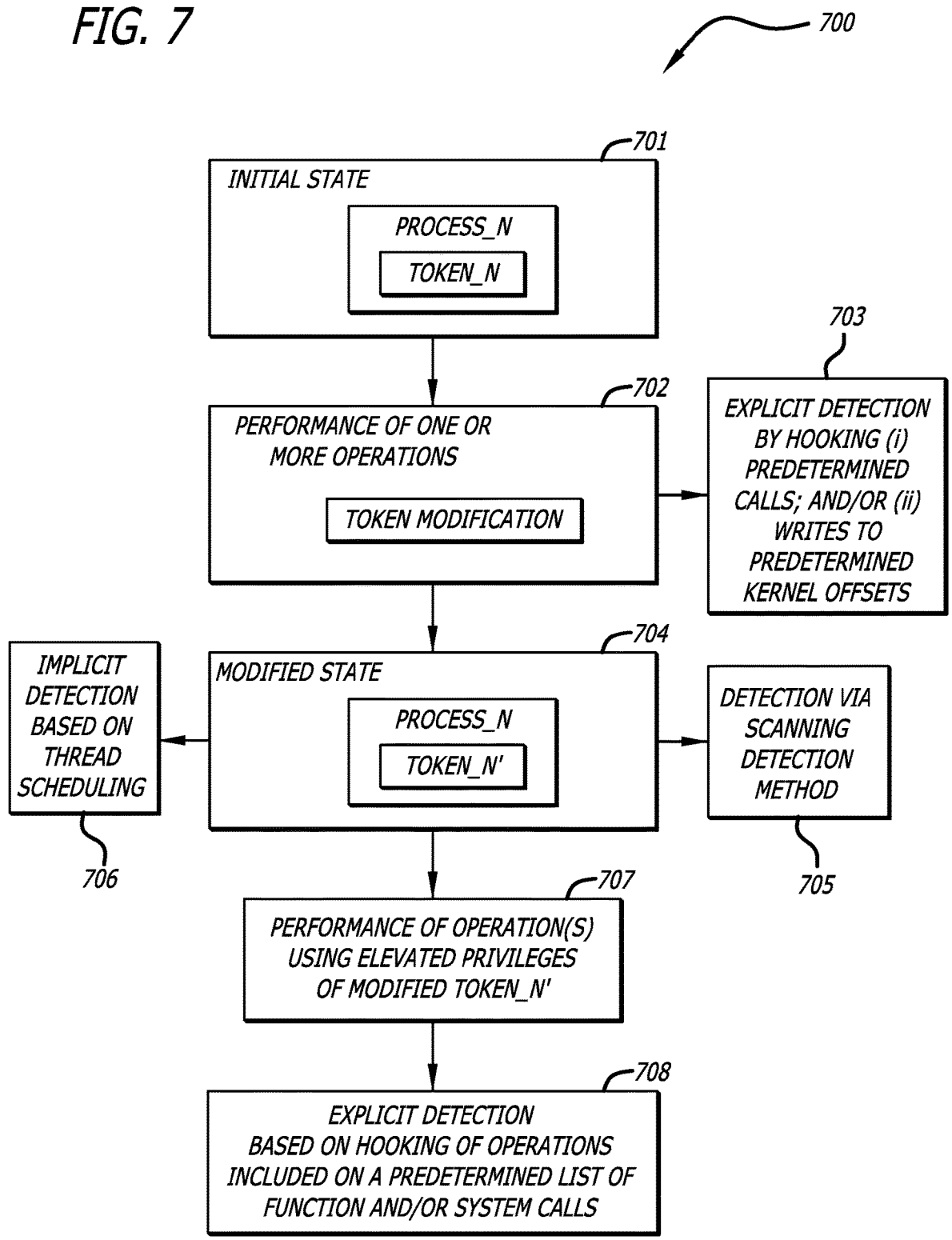
FIG. 7 is a flowchart illustrating an exemplary process that occurs when a token is modified and potential points within the process that the modification may be detected.

Referring to FIG. 7, a flowchart illustrating an exemplary process that occurs when a token is modified and potential points within the process that the modification may be detected is shown. Each block illustrated in FIG. 7 represents an operation performed in the method 700 of detecting the token associated with a process has been modified. Referring to FIG. 7, the Process_N is shown in an initial (e.g., clean) state wherein the Token N is associated with the Process_N (block 701). At block 702, one or more operations are performed causing the modification of Token_N. Herein, the operations performed that cause the modification of Token_N may be a result of function calls made by Process_N and/or may be a result of an exploit of a vulnerability performed by a process other than Process_N. The method 700 is directed at the detection of the modification of the privilege(s) of Process_N; therefore, the modification of Token_N as used herein should be interpreted as the modification of the privileges set forth in Token_N. Specifically, the privilege(s) set forth in Token_N' are greater than the privilege(s) set forth in Token_N.

At block 703, the EoP detection system may detect the modification of Token_N via the explicit detection method, if implemented, by hooking (i) one or more function and/or system calls (e.g., calls that result in a write to token structures), or (ii) by trapping writes to kernel offsets associated with a token structure within the VMM hypervisor layer or guest kernel layers. Herein, when the EoP detection system traps one or more writes to kernel offsets associated with a token structure, the EoP detection system does not trap specific function or system calls but traps any write to a predetermined kernel offset, determines the function or system call that resulted (directly or indirectly) in the trapped write, and therein detecting the process, and the token associated therewith, responsible for causing the write to the predetermined kernel offset. At block 704, the Process_N is shown in a modified state wherein the modified Token_N is represented by Token_N'. The modification of Token_N to Token_N' may be detected via the scanning detection method, if implemented (block 705). For example, an automatic scan of the current process list and comparison of the privileges of the current processes to the privilege list (as discussed above, the recordation of the privilege(s) of each process at the time the process was created), would reveal that the privilege(s) of Process_N have been modified from those in Token_N to those in Token_N'.

Additionally, or in the alternative, the EoP detection system may detect the modification of Token_N (Token_N) via the implicit detection method, if implemented (block 706). For example, the EoP detection system may detect the presence of Token_N' by (i) monitoring the guest kernel scheduler, in the guest OS of a VM, and employ a detection mechanism when a thread of interest (or all threads) is scheduled for execution, and (ii) hook the scheduling of threads within the hypervisor (e.g., the VMM) and employ a detection mechanism when a thread of interest (or all threads) is scheduled for execution. When the scheduling of a thread is hooked, the EoP detection system may determine whether the scheduled thread is operating with Token_N'. Specifically, a thread scheduled by Process_N should not have privilege(s) greater than those of Process_N. Therefore, based on the detection of the thread having the privilege(s) of Token_N', the EoP detection system has detected that Process_N must be operating with the privilege(s) of Token_N' which differ from those of Token_N. The difference is determined by a comparison or correlation of the privilege(s) set forth for Process_N on the privilege list and the privilege(s) set forth in Token_N'.

In one embodiment, when the modification of Token_N to Token_N' is not detected by the explicit detection method via hooking function and/or system calls that result in writing data to a particular location in memory, the scanning detection method or the implicit detection method, Process_N may perform operations (e.g., make function and/or system calls) using the elevated privilege(s) set forth in Token_N' (block 707). At block 708, the EoP detection system detects the modification of Token_N to Token_N' via the explicit detection method based on hooking function and/or system calls appearing on a predetermined list of function and/or system calls. For example, via experiential knowledge, the EoP detection system may include a predetermined list of function and/or system calls that are likely to be targeted by malware attempting to exploit a vulnerability providing the malware the ability to modify the privilege(s) set forth in the token associated with a process. As discussed above with respect to the detection of the modification of Token_N to Token_N' via the implicit detection method, the difference between Token_N and Token_N' is determined by a comparison or correlation of the privilege(s) set forth for Process_N on the privilege list and the privilege(s) set forth in Token_N' (herein, those required to request the hooked function or system call).

Figure 8:
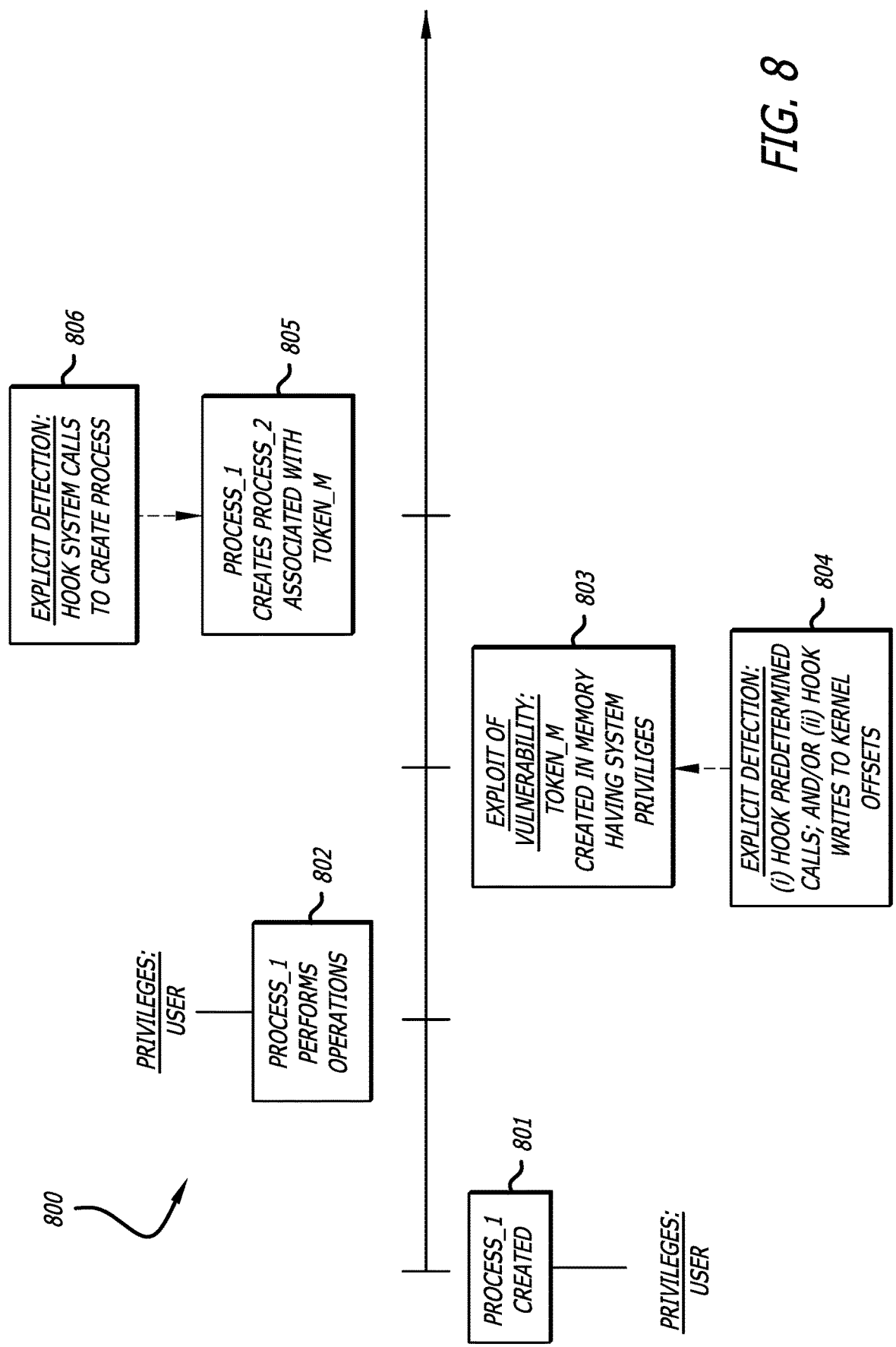
FIG. 8 is an exemplary timeline illustrating a process of exploiting a vulnerability to create a process have an escalated privilege.

Referring to FIG. 8, an exemplary timeline illustrating a process of exploiting a vulnerability to create a process having an escalated privilege is shown. The timeline 800 of FIG. 8 illustrates a plurality of events occurring over time, which increases from left to right. At event 801, Process_1 is created, wherein Process_1 is granted a privilege level of User. At event 802, Process_1 performs one or more operations requiring a privilege level of User. The one or more operations performed at event 802 are not of interest to the EoP detection system as the privilege level required to make the function and/or system calls associated therewith is not greater than the privilege level associated with Process_1 on the privilege list (assuming one or more of the operations performed are hooked by the EoP detection system).

Figure 9:
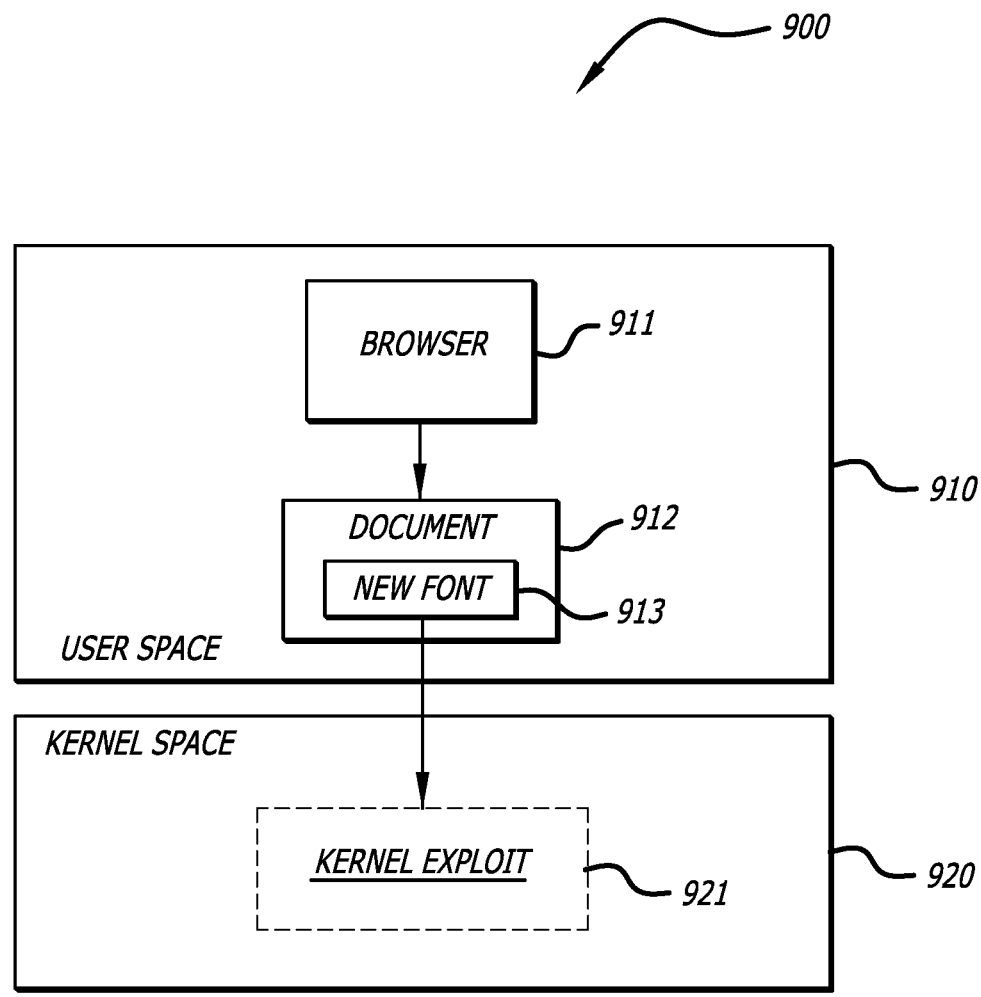
FIG. 9 is a block diagram illustrating an exemplary exploit of a vulnerability that may be utilized to facilitate an exploit of privilege attack.

At event 803, the execution of an exploit of a vulnerability takes place. In the embodiment illustrated in FIG. 8, the exploit comprises the creation of Token_M in memory having a privilege level of System. Referring to FIG. 9, a block diagram illustrating an exemplary exploit of a vulnerability that may be utilized to facilitate an exploit of privilege attack is shown. The diagram 900 illustrates one embodiment of an exploit of a vulnerability in which a token, e.g., Token_M of FIG. 8, may be created in memory. The diagram 900 includes a portion 910 representing User space in memory and a portion 920 representing Kernel space in memory. Additionally, a process 911, e.g., a browser process, is seen executing in User space. The browser process 911 is seen to open a document 912, e.g., a Microsoft® Word document, which attempts to load a new font 913 into Kernel space 920. The loading of the new font 913 may be the execution of an exploit of a vulnerability within the font renderer within the Kernel space 920, e.g., the kernel exploit 921, as a font is a system resource. The kernel exploit 921 may be, for example, the creation of a token having System privileges such that a process may now create a child process and associate the child process with the newly created token thereby potentially illegitimately granting the child process System privileges.

Referring back to FIG. 8, the exploit of the vulnerability at event 803 may be detected at event 804 by the EoP detection system when the EoP detection system implements an explicit detection method that hooks function and/or system calls that write to and/or create token structures in a specified portion of memory (e.g., a portion of memory determined, via experiential knowledge, to be most likely to be subject to the creation of token structures from the exploitation of a vulnerability, wherein the specified portion of memory is less than the entire memory space). Additionally, the exploit of the vulnerability at event 803 may be detected at event 804 by the EoP detection system through trapping function and/or system calls that write to token structures and/or function and/or system calls that write to predetermined kernel offsets (as discussed above) within the guest kernel layers. When the EoP detection system does not hook the particular function or system call resulting in the exploit of the vulnerability at 803, the Process_1 creates Process_2 associated with Token_M at event 805. The creation of Process_2 associated with Token_M having a privilege level of System by Process_1 having a privilege level of User may be considered an EoP attack as Process_1 has created a process having a greater privilege than it has been granted and/or with which it is currently operating.

The EoP detection system may detect the presence of a potential EoP attack when the EoP detection system implements an explicit detection method that hooks system calls to create a process. By hooking system calls to create a process, the EoP detection system may compare the privilege of the creating process, Process_1, with the privilege of the created process, Process_2. When the privilege of the created process is greater than the privilege of the creating process, the reporting phase of the EoP detection system may further analyze the two processes and their respective tokens to determine whether an EoP attack is present.

Figure 10:
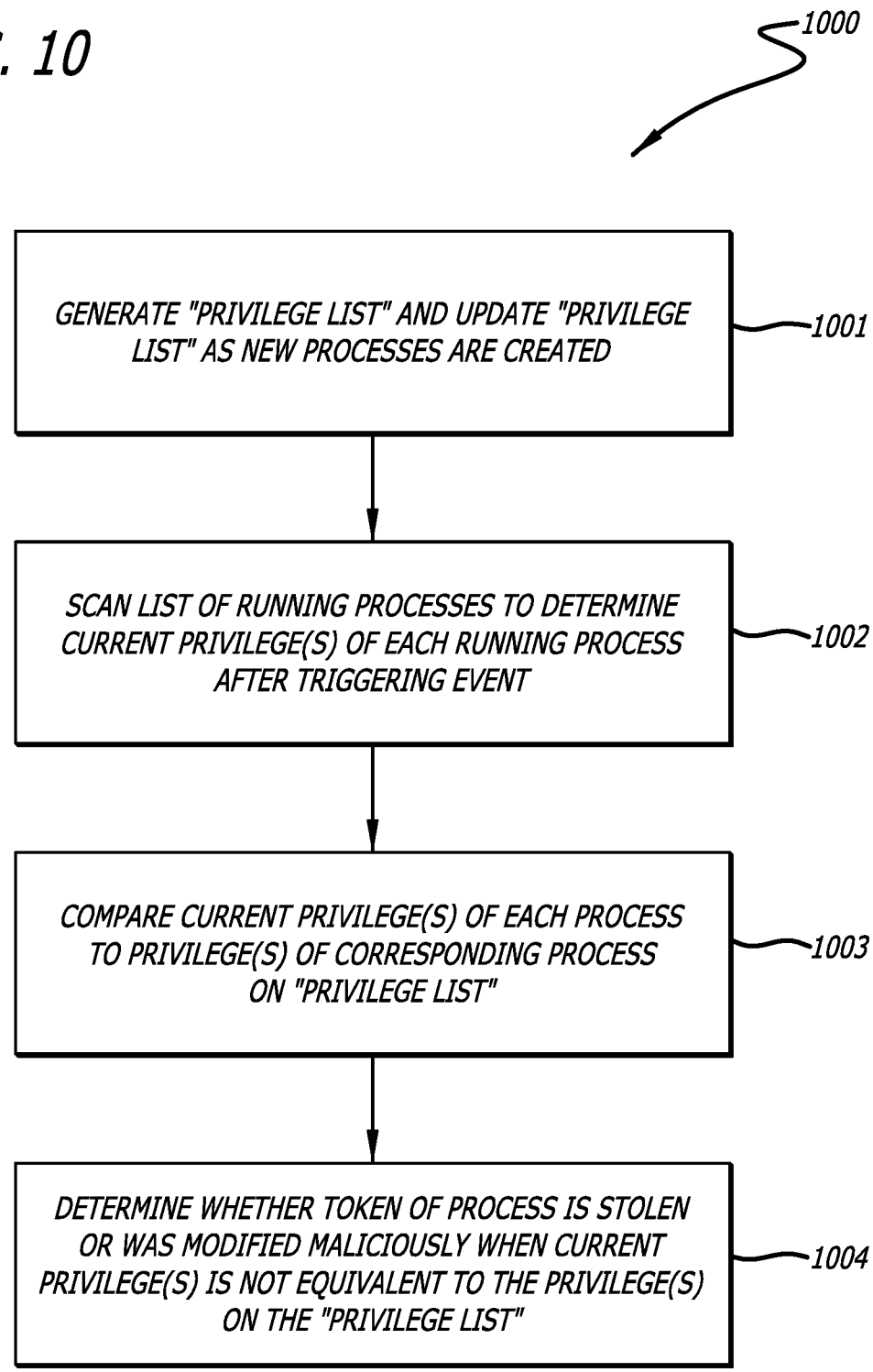
FIG. 10 is a flowchart illustrating a process for detecting potential exploit of privilege attack using periodic or aperiodic scanning of a list of running processes.

Referring to FIG. 10, a flowchart illustrating a process for detecting potential exploit of privilege attacks using periodic or aperiodic scanning of a list of running processes is shown. Each block illustrated in FIG. 10 represents an operation performed in the method 1000 of detecting potential exploit of privilege attacks using a scanning detection method. Referring to FIG. 10, a privilege list, as discussed above in accordance with FIG. 3, is generated and updated by the EoP detection system as new processes are created (block 1001). At block 1002, the EoP detection scans a list of running processes, e.g., as illustrated in FIG. 1, to determine the privileges with which each currently running process is operating.

At block 1003, the EoP detection system compares the privileges of each currently running process with the privilege(s) provided on the privilege list for the corresponding process. The EoP detection system then determines whether the token associated with a first process is stolen or was malicious modified when the current privilege(s) of the first process is greater than the privilege(s) provided on the privilege list for the first process (block 1004).

Figure 11:
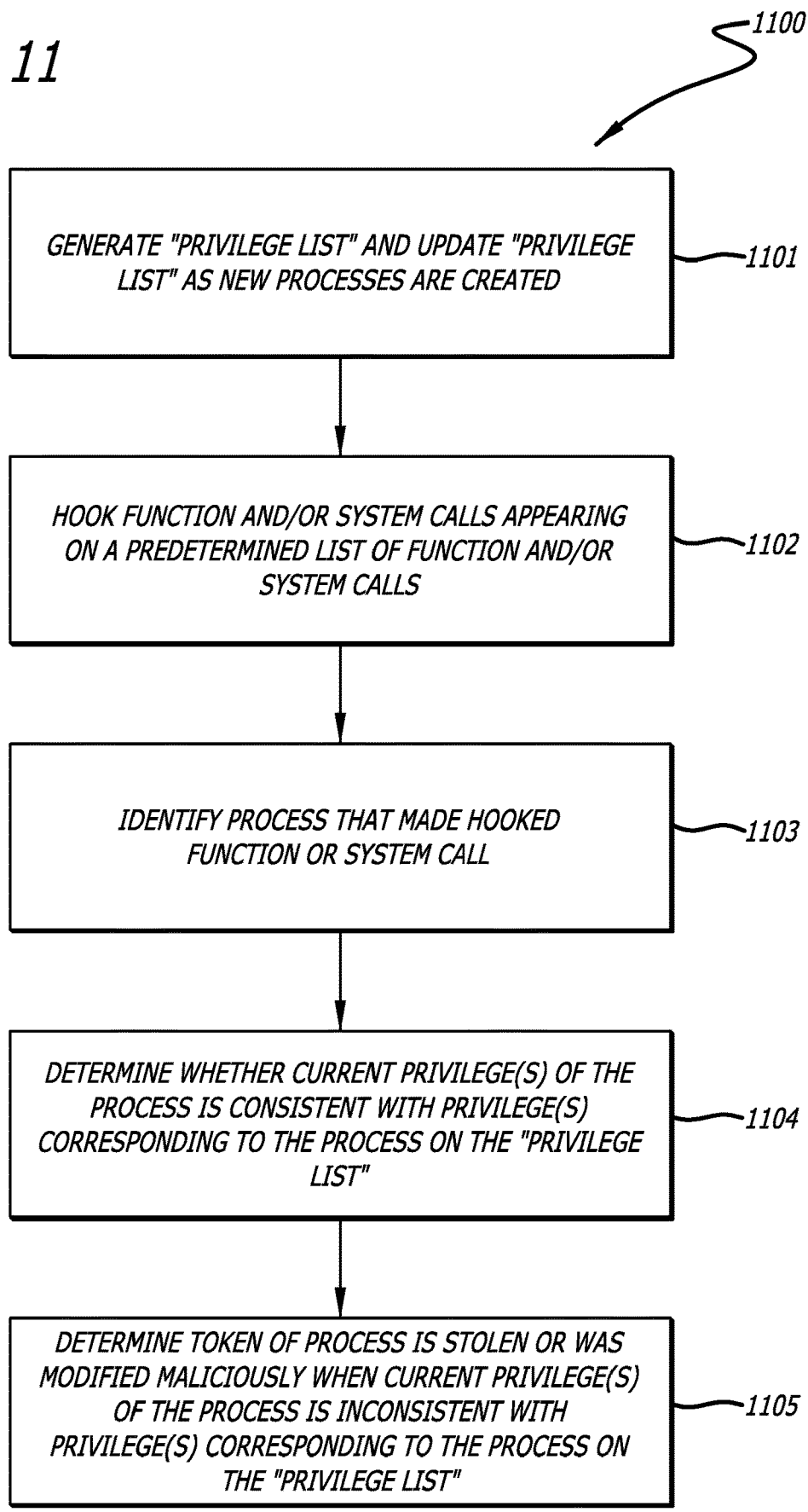
FIG. 11 is a flowchart illustrating a process for detecting potential exploit of privilege attack by hooking one or more predetermined function calls.

Referring to FIG. 11, a flowchart illustrating a process for detecting potential exploit of privilege attack by hooking one or more predetermined function calls is shown. Each block illustrated in FIG. 11 represents an operation performed in the method 1100 of detecting potential exploit of privilege attacks using an explicit detection method. Referring to FIG. 11, a privilege list, as discussed above in accordance with FIG. 3, is generated and updated by the EoP detection system as new processes are created (block 1101). At block 1102, the EoP detection system inserts hooks onto one or more function and/or system calls. In one embodiment, this may be performed within the Kernel space (e.g., the Kernel space 920 as illustrated in FIG. 9).

When a function call or system call is hooked, the EoP detection system identifies the process that made the function or system call and identifies the current privilege(s) of the process (block 1103). At block 1104, the EoP detection system determines whether the "current privileges" (i.e., the current privilege(s) of the process) are consistent with the privilege(s) of the process on the privilege list or learned privilege list. When the current privilege(s) of the process are inconsistent with the privilege(s) provided for the process on the privilege list, the EoP detection system determines whether the token associated with the process is stolen or was modified maliciously.

Figure 12:
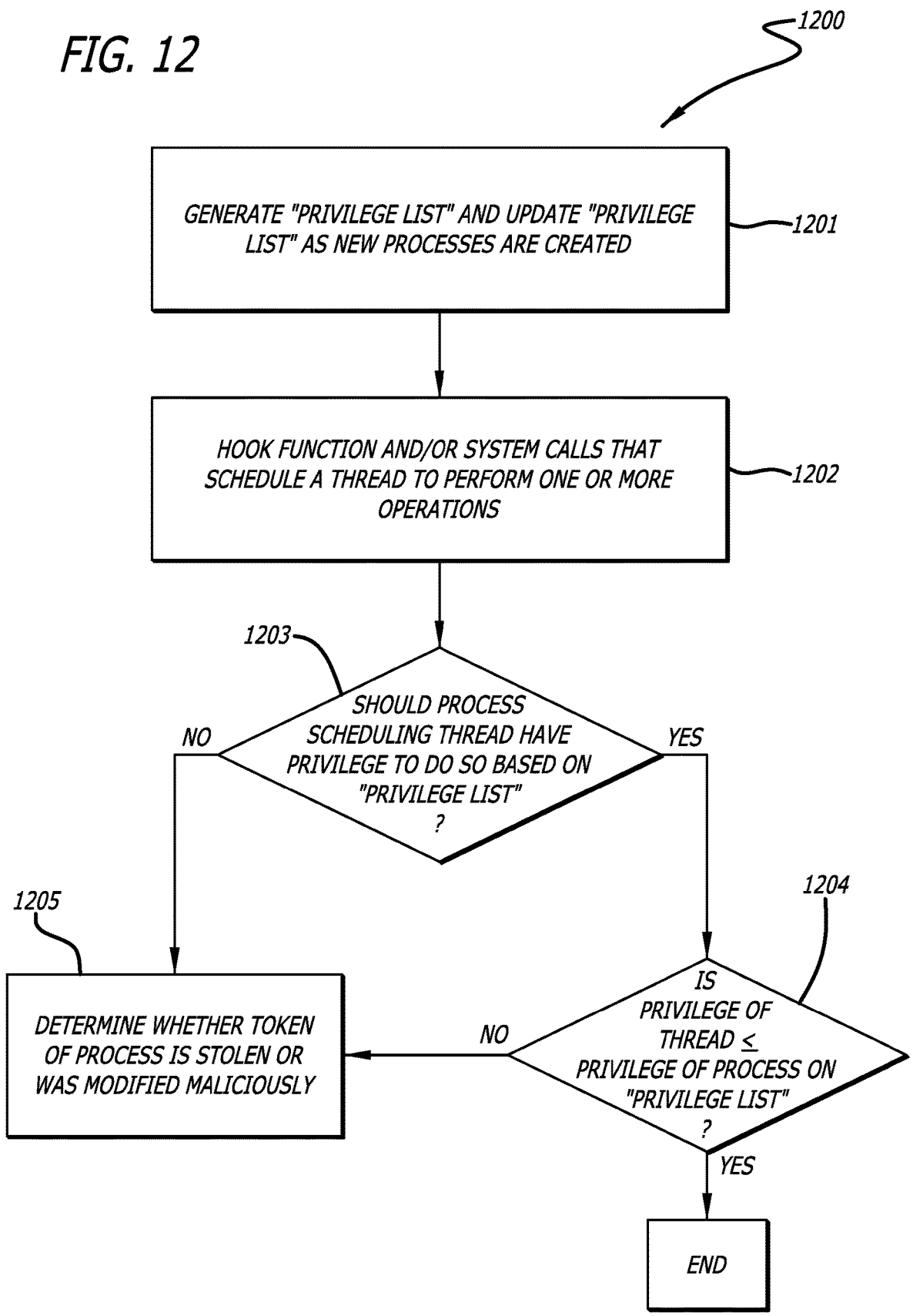
FIG. 12 is a flowchart illustrating a process for detecting potential exploit of privilege attack by analyzing scheduling of one or more threads of one or more processes.

Referring to FIG. 12, a flowchart illustrating a process for detecting potential exploit of privilege attack by analyzing scheduling of one or more threads of one or more processes is shown. Each block illustrated in FIG. 12 represents an operation performed in the method 1200 of detecting potential exploit of privilege attacks using an implicit detection method. Referring to FIG. 12, a privilege list, as discussed above in accordance with FIG. 3, is generated and updated by the EoP detection system as new processes are created (block 1201). At block 1202, the EoP detection system may (i) hook the guest kernel scheduler, in the guest OS of a VM, and employ a detection mechanism when a thread of interest (or all threads) is scheduled for execution, and/or (ii) hook the scheduling of threads within the hypervisor (e.g., the VMM) and employ a detection mechanism when a thread of interest (or all threads) is scheduled for execution.

Once a function or system call is hooked, the EoP detection system makes a determination as to whether the process making the hooked function or system call scheduling the thread should have the privilege to do so (block 1203). Herein, the EoP detection system identifies the process making the hooked function or system call and compares the level of privilege required to make the hooked function or system call with the level of privilege provided for the process on the privilege list. When the privilege level provided for the process scheduling the thread on the privilege list is greater than or equal to the privilege required to schedule the thread (yes at block 1203), the EoP detection then determines whether the privilege of the thread is no greater than the privilege level provided for the process scheduling the thread on the privilege list (block 1204). When the privilege of the thread is less than or equal to (yes at block 1204), the method 1200 ends as the EoP detection system determines no EoP attack is present. In one embodiment, the privilege level of the thread may be the privilege level of the process scheduling the thread. In a second embodiment, a thread have an individual privilege level that may be the same as or different than the process scheduling it. For example, the process scheduling the thread may dictate the privilege level of the thread during the scheduling of the thread.

When the privilege of the thread is greater than the privilege level set forth in the privilege list for the process scheduling the thread (no at block 1204), the EoP detection system determines whether the token associated with the process scheduling the thread is stolen or was modified maliciously (block 1205). Similarly, when the privilege required to schedule the thread is greater than the level of privilege provided for the process scheduling the thread on the privilege list (no at block 1203), the EoP detection system determines whether the token associated with the process scheduling the thread is stolen or was modified maliciously (block 1205). In one embodiment, the privilege of the thread is the privilege of the process that contains the thread. Alternatively, the privilege of the thread may be determined by the user privilege in the impersonation token when a thread in a process is running in the context of another user (e.g., impersonation).

In each of the methods 1000, 1100 and 1200, when the EoP detection system is to determine whether the token associated with a process is stolen or was modified maliciously (block 1004, block 1105 and block 1205, respectively), the reporting phase of the EoP detection system, as discussed below, performs analyses to make such a determination. In one embodiment, at this instance, the detection phase of the EoP detection system ends. However, in a second embodiment, the detection phase may continue to run, e.g., run concurrently (e.g., at least partially overlapping at the same time) with the reporting phase.

3. Reporting Phase

Figure 13:
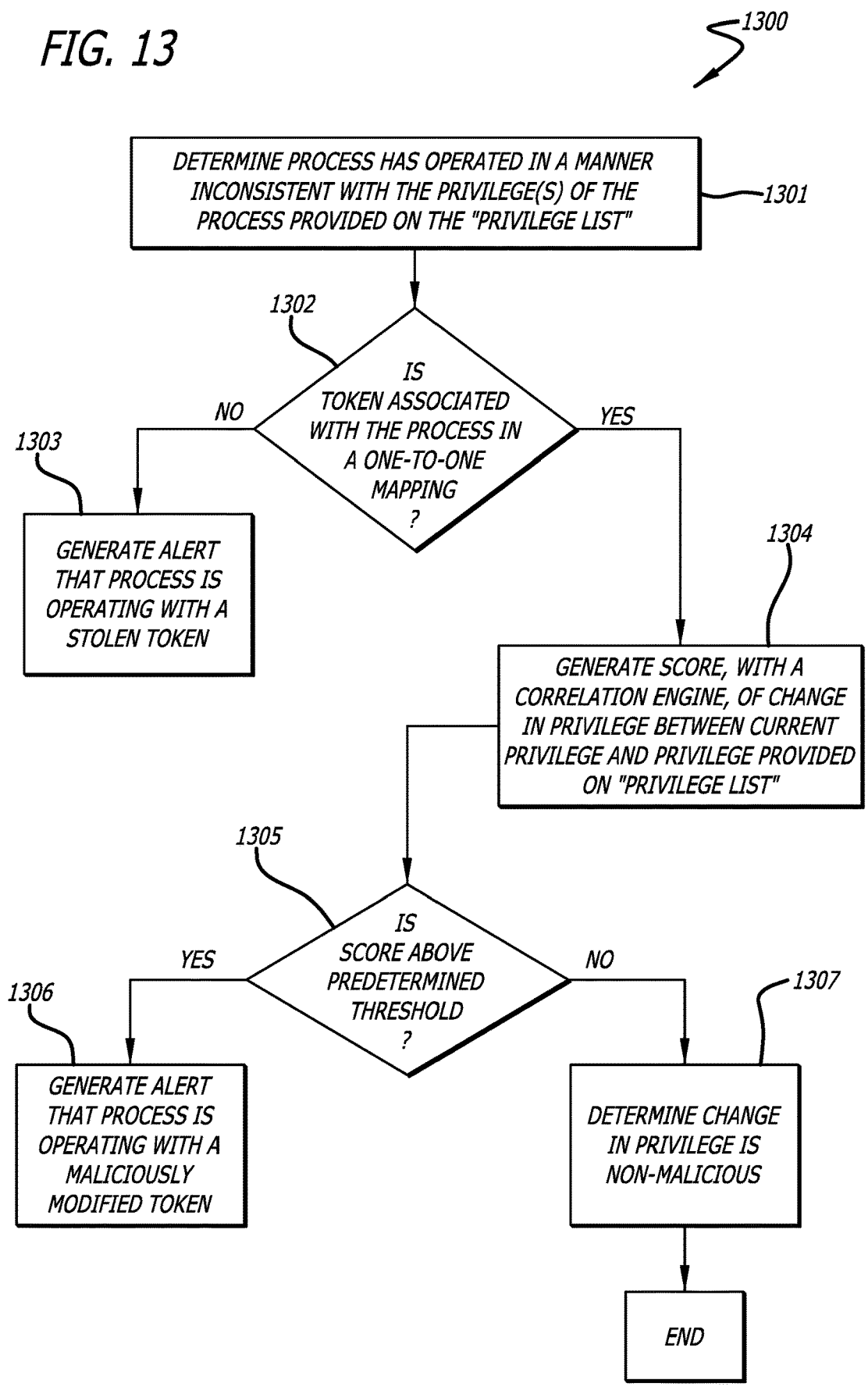
FIG. 13 is a flowchart illustrating a process for determining whether a token has been modified or stolen.

Referring to FIG. 13, a flowchart illustrating a process for determining whether a token has been modified or stolen is shown. Each block illustrated in FIG. 13 represents an operation performed in the method 1300 of determining whether a token has been modified maliciously or stolen. Referring to FIG. 13, at block 1301, the EoP detection system has determined that a process has operated in a manner inconsistent with the privilege(s) provided for the process on the privilege list, via the scanning detection method, the implicit detection method or the explicit detection method, as discussed above. At block 1302, the EoP detection system makes a determination as to whether the token is associated with the process in a one-to-one mapping. For example, the EoP detection system may compare the pointer corresponding to the token associated with the process to the pointer corresponding to the token associated with each running process. As discussed in FIG. 1, each process in a "clean" system will be associated with a token in a one-to-one mapping, and thus, the location to which the pointer points will also have a one-to-one mapping with a process. Therefore, if two pointers point to a single location in memory, the system may be deemed "unclean" or "malicious," such that at least one token is operating with a stolen token. The one-to-one mapping of a token to a process may be determined in alternative ways, which may include analyzing, inter alia, an opaque structure field present in each token, serial numbers, reference counts, offsets of handles/indexes/pointers/memory locations, or the like. The one-to-one mapping of a token to a process may also be determined by a combination of two or more of the above.

Additional techniques may be utilized to determine one-to-one mapping of the token to the process. Other operating systems such as Mac OS X or those that are Linux-based may have implementation specific (opaque) kernel structure(s) which may also be utilized in exploit of privilege attacks. Alternative embodiments of the detection of exploit of privileges on Linux-based or Mac OS X operating systems involve the determination of kernel objects in these Linux-based or Mac OS X operating systems, wherein the kernel objects should be associated with each process (or thread(s) of each process) in a one-to-one-mapping and are utilized for privilege/security management and have been modified or stolen from other running processes.

When the EoP detection system determines the token is not associated with the process in a one-to-one mapping (no at block 1302), the EoP detection system generates an alert that the process is operating with a stolen token (block 1303). Such an alert may include various types of messages, which may include text messages and/or email messages, video or audio stream, or other types of information over a wired or wireless communication path. An alert may include information such as, for example, identification of the process, identification of the token, an indication the token was stolen, process with which the token was originally associated, the function or system call that was hooked, if applicable, etc.

When the token is determined to be associated with a process in a one-to-one mapping, i.e., the token is not operating with a stolen token (yes at block 1302), a correlation engine of the EoP detection system generates a score of the change in privilege(s) between the current privilege(s) and the privilege(s) provided on the privilege list for the process (block 1304). Information collected by the EoP detection system during the detection phase (e.g., through the scanning detection method, explicit detection method, and/or implicit detection method) is provided to the correlation engine, which generates a score that indicates the likelihood that the change in privilege(s) of the process is malicious. As illustrated in FIG. 4, the privileges of a process may change over time; however, the change may not be unwanted or malicious. Therefore, the correlation engine analyzes the information collected during the detect phase and determines a score indicating the likelihood the change is unwanted or malicious through the application of one or more rules to the collected information. Examples of information that may be collected during the detection phase include, but are not limited or restricted to, process identification, initial privilege level of the process, current privilege level of the process, initial privileges enabled for the process, current privileges enabled for the process, time since the creation of the process, or the like. The fields and sub-structures of the "token" may also be provided to the correlation engine, examples: privilege-structure fields, identification information related to one or more of (i) the user's account, (ii) one or more groups to which the user belongs and/or (iii) the current session, and/or other relevant field.

At block 1305, the EoP detection system determines whether the score is above a predetermined threshold. When the score is not above the predetermined threshold (no at block 1305), the EoP detection system determines the change in privilege is non-malicious (block 1307) and the method 1300 subsequently ends. When the score is above the predetermined threshold (yes at block 1306), the EoP detection system generates an alert that the process is operating with a stolen token. An alert may include information such as, for example, identification of the process, identification of the token, an indication the token was maliciously modified, the modification(s) to the token, the function or system call that was hooked—if applicable, etc.

III. Logical Representation

Referring to FIG. 14, an exemplary embodiment of a logical representation of an exploit of privilege detection system is shown. The exploit of privilege (EoP) detection system 1400 includes one or more processors 1401 that are coupled to communication interface logic 1402 via a first transmission medium 1403. Communication interface logic 1402 enables communication with network devices via the Internet, the cloud computing services and one or more the endpoint devices. According to one embodiment of the disclosure, the communication interface logic 1402 may be implemented as a physical interface including one or more ports for wired connectors. Additionally, or in the alternative, the communication interface logic 1402 may be implemented with one or more radio units for supporting wireless communications with other electronic devices.

The processor(s) 1401 is further coupled to persistent storage 1410 via a second transmission medium 1404. According to one embodiment of the disclosure, persistent storage 1410 may include (a) the static analysis logic 1420 including a heuristics logic 1421, a signature matching logic 1422, a signature database 1403 and a score determination logic 1424, (b) a dynamic analysis logic 1430 including one or more VMs 1431-1432, a virtual machine manager (VMM) 1433, a monitoring logic 1434, a score determination logic 1435, a build logic 1436, a detection logic 1437 and a reporting logic 1438, (c) an alert generation logic 1440, and (d) a correlation engine 1450. Of course, when implemented as hardware, one or more of these logic units could be implemented separately from each other.

IV. Endpoint Device Deployment

In another embodiment, the EoP detection system may be deployed in an endpoint device. Similar to the deployment discussed above regarding the network appliance, the EoP detection system deployed within an endpoint device includes a three phase detection methodology: (1) build phase, (2) detection phase, and (3) reporting phase.

The build phase in the endpoint device deployment is the same as discussed above. The EoP detection system generates a privilege list which stores, for each process, inter alia, a process identifier, and the privilege level of the process. As was also discussed above, the privilege list may optionally include identification information of the token corresponding to the process. FIG. 3 display a sample privilege list 300. Herein, the use of "privilege list" should be interpreted as including the "privilege list" and the "learned privilege list," as discussed above.

The detection phase in the endpoint device deployment is similar to the detection phase as discussed above in connection with the network appliance deployment. In particular, the detection phase in the endpoint device deployment includes one or more of three detection method: (i) a scanning detection method, (ii) an explicit detection method, and/or (iii) an implicit detection method. The scanning detection method is implemented in the same manner as with the network appliance deployment. Specifically, the scanning detection method implemented in the endpoint device deployment compares the privilege(s) of each currently running process (e.g., running at the time the detection methodology begins) with the privilege(s) corresponding to each currently running process on a privilege list (created in the build phase and updated when a process is created, or at another triggering event, e.g., a predetermined time interval). Additionally, the scanning detection method may compare the identification information of the token associated with one or more currently running processes with (i) the identification information of the token on the privilege list, and/or (ii) the identification information of the token associated with the token of predetermined processes (e.g., those processes most likely to be stolen, which may be one or more System processes determined via experiential knowledge) via direct inspection by the EoP detection system of the predetermined processes.

The explicit detection method implemented in the endpoint device deployment is similar to the explicit detection method implemented in the network appliance; however, when implemented within an endpoint device deployment, the EoP detection system identifies whether each hooked function and/or system call (i.e., each call monitored, for example, by a software agent executing on the endpoint device) was initiated and/or verified by a user of the endpoint device and/or an administrator (e.g., an information technology (IT) group overseeing an enterprise network). Examples of initiation or verification methods that may be performed by a user include, but are not limited to, activation of a button provided on a graphical user interface (GUI), voice confirmation, and/or input of login credentials (e.g., username and/or password)). The identification of whether the initiation of each function and/or system call was verified and/or initiated by a user of the endpoint device and/or a network administrator comprises additional metadata that is provided to the correlation engine and is to be used in the determination of a score indicating the likelihood that an EoP attack is present. For example, when the use of a system call is hooked, the EoP detection system identifies whether the system call was initiated and/or verified by a user action and/or an action of a network administrator.

The implicit detection method implemented in the endpoint device deployment is similar to the implicit detection method implemented in the network appliance; however, as discussed above with the explicit detection method implemented in an endpoint device deployment, when implemented within an endpoint device deployment, the EoP detection system identifies whether each hooked function and/or system call was initiated and/or verified by a user of the endpoint device and/or a network administrator. Similarly, the identification of whether the initiation of each function and/or system call was verified and/or initiated by a user of the endpoint device and/or a network administrator comprises additional metadata that is provided to the correlation engine and is to be used in the determination of a score indicating the likelihood that an EoP attack is present.

Finally, the reporting phase in the endpoint device deployment is similar to the reporting phase as discussed above in connection with the network appliance deployment. Specifically, at a high level, the EoP detection system enters the reporting phase when the EoP detection system has detected that a first process has operated in a manner inconsistent with the privilege(s) provided on the privilege list corresponding to the first process. When in the reporting phase while in an endpoint device deployment, the EoP detection system determines whether the token of the first process is associated with the first process in a one-to-one mapping and generates an alert indicating that the first process is operating with a stolen token when the token is not associated with the first process in a one-to-one mapping. When the token of the first process is associated with the first process in a one-to-one mapping, the information collected during the detection phase, including the additional metadata discussed above, is provided to a correlation engine, which generates a score indicating the likelihood that an EoP attack is present (e.g., whether the change in privilege(s) of the first process is malicious or unwanted). When the score is determined to be above a predetermined threshold, an alert is generated indicating that the first process is operating with a malicious modified token.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory storage medium having stored thereon logic, the logic being executable by one or more processors to perform operations including:
   responsive to detecting creation of a first process, adding data to a privilege list, the data including (i) identification information of the first process and (ii) an initial privilege of the first process, wherein the data added to the privilege list is set forth in a first token associated with the first process, and the first token being associated with the first process in a one-to-one mapping at a time the data is added to the privilege list;
   detecting performance of one or more operations and a modification of the first token that is associated with the first process, wherein the modification of the first token alters a current privilege of the first process to be greater than the initial privilege;

responsive to detecting the performance of the one or more operations and the modification of the first token, comparing a current privilege of the first process with the initial privilege of the first process recorded in the privilege list;

determining a change exists between the current privilege of the first process and the initial privilege of the first process that is greater than a predetermined threshold;

responsive to determining the change exists between the current privilege of the first process and the initial privilege of the first process that is greater than the predetermined threshold, determining the first process is operating with the current privilege due to an exploit of privilege attack; and responsive to determining the first process is operating with the current privilege due to an exploit of privilege attack, generating an alert that the first process operating with the current privilege due to the exploit of privilege attack.

2. The non-transitory storage medium of claim 1, wherein the first process is running within a virtual machine and a virtual machine monitor performs intercepting of a request by the first process, the comparing of the current privilege of the first process with the initial privilege of the first process performed in response to intercepting the request by the first process, the request being one of a predetermined set of software calls.

3. The non-transitory storage medium of claim 1, wherein the logic being executable by the one or more processors to perform operations further including:

intercepting execution of an instruction to write data to a predetermined offset in memory by the first process;

responsive to intercepting the execution of the instruction to write data to the predetermined offset in memory by the first process, comparing the current privilege of the first process with the initial privilege of the first process recorded in the privilege list.

4. The non-transitory storage medium of claim 1, wherein the logic being executable by the one or more processors to perform operations further including:

monitoring scheduling of threads by the first process; and responsive to detecting scheduling of a thread by the first process, comparing the current privilege of the first process with the initial privilege of the first process recorded in the privilege list.

5. The non-transitory storage medium of claim 1, wherein the logic being executable by the one or more processors to perform operations further including:

responsive to determining a change exists between the current privilege of the first process and the initial privilege of the first process, generating, by a correlation engine, a score indicating whether the change in the current privilege of the first process and the initial privilege of the first process is due to an exploit of privilege attack.

6. The non-transitory storage medium of claim 1, wherein the initial privilege is recorded in the privilege list at a first time, and the current privilege is determined at a second time, the second time subsequent to the first time.

7. The non-transitory storage medium of claim 1, wherein the first token is an object having a specified structure that stores information describing privileges granted to the first process.

8. The non-transitory storage medium of claim 1, wherein a privilege comprises a privilege level.

9. A system comprising:

one or more processors; and a non-transitory storage medium having stored thereon instructions, the instructions being executable by one or more processors to perform operations including:

responsive to detecting creation of a first process, adding data to a privilege list, the data including (i) identification information of the first process and (ii) an initial privilege of the first process, wherein the data added to the privilege list is set forth in a first token associated with the first process, and the first token being associated with the first process in a one-to-one mapping at a time the data is added to the privilege list;

detecting performance of one or more operations and a modification of the first token that is associated with the first process, wherein the modification of the first token alters a current privilege of the first process to be greater than the initial privilege;

responsive to detecting the performance of the one or more operations and the modification of the first token, comparing a current privilege of the first process with the initial privilege of the first process recorded in the privilege list;

determining a change exists between the current privilege of the first process and the initial privilege of the first process that is greater than a predetermined threshold;

responsive to determining the change exists between the current privilege of the first process and the initial privilege of the first process that is greater than the predetermined threshold, determining the first process is operating with the current privilege due to an exploit of privilege attack; and responsive to determining the first process is operating with the current privilege due to an exploit of privilege attack, generating an alert that the first process operating with the current privilege due to the exploit of privilege attack.

10. The system of claim 9, wherein the running processes are running within a virtual machine.

11. The system of claim 9, wherein the data added to the privilege list is set forth in the first token associated with the first running process, the first token being associated with the first running process in a first one-to-one mapping at a time the data is added to the privilege list.

12. The system of claim 11, wherein determining the change exists between the current privilege of the first running process and the initial privilege of the first running process is performed by determining whether the first token is associated with the first running process in the first one-to-one mapping at a time of a scanning of a list of all running processes.

13. The system of claim 12, wherein determining whether the first token is associated with the first running process in the first one-to-one mapping at the time of the scanning of the list of all running processes is performed by determining whether a location in memory at which the first token is stored is associated with the first token in a second one-to-one mapping.

14. The system of claim 9, wherein the instructions being executable by the one or more processors to perform operations further including:

responsive to determining the first running process is operating with the current privilege due to an exploit of privilege attack, generating an alert that the first running process operating with the current privilege due to the exploit of privilege attack.

15. The system of claim 9, wherein the initial privilege is recorded in the privilege list at a first time, and the current privilege is determined at a second time, the second time subsequent to the first time.

16. The system of claim 9, wherein the first token is an object having a specified structure that stores information describing privileges granted to the first running process.

17. The system of claim 9, wherein a privilege comprises a privilege level.

18. A method for detecting an exploit of privilege attack comprising:
responsive to detecting creation of a first process, adding data to a privilege list, the data including (i) identification information of the first process and (ii) an initial privilege of the first process, wherein the data added to the privilege list is set forth in a first token associated with the first process, and the first token being associated with the first process in a one-to-one mapping at a time the data is added to the privilege list;
detecting performance of one or more operations and a modification of the first token that is associated with the first process, wherein the modification of the first token alters a current privilege of the first process to be greater than the initial privilege;
responsive to detecting the performance of the one or more operations and the modification of the first token, comparing a current privilege of the first process with the initial privilege of the first process recorded in the privilege list;
determining a change exists between the current privilege of the first process and the initial privilege of the first process that is greater than a predetermined threshold;
responsive to determining the change exists between the current privilege of the first process and the initial privilege of the first process that is greater than the predetermined threshold, determining the first process is operating with the current privilege due to an exploit of privilege attack; and
responsive to determining the first process is operating with the current privilege due to an exploit of privilege attack, generating an alert that the first process operating with the current privilege due to the exploit of privilege attack.

19. The method of claim 18, wherein the first process is running within a virtual machine and the comparing of the current privilege of the first process with the initial privilege of the first process is performed in response to intercepting a request by the first process, the request being one of a predetermined set of software calls.

20. The method of claim 18 further comprising:
intercepting execution of an instruction to write data to a predetermined offset in memory by the first process;
responsive to intercepting execution of the instruction to write data to the predetermined offset in the memory by the first process, comparing the current privilege of the first process with the initial privilege of the first process recorded in the privilege list.

21. The method of claim 18 further comprising:
monitoring scheduling of threads by the first process; and
responsive to detecting scheduling of a thread by the first process, comparing the current privilege of the first process with the initial privilege of the first process recorded in the privilege list.

22. The method of claim 18, wherein the data added to the privilege list is set forth in the first token associated with the first process, and first token being associated with the first process in a one-to-one mapping at a time the data is added to the privilege list.

23. The method of claim 18 further comprising:
responsive to determining the first process is operating with the current privilege due to an exploit of privilege attack, generating an alert that the first process operating with the current privilege due to the exploit of privilege attack.

24. The method of claim 18 further comprising:
responsive to determining a change exists between the current privilege of the first process and the initial privilege of the first process, generating, by a correlation engine, a score indicating whether the change in the current privilege of the first process and the initial privilege of the first process is due to an exploit of privilege attack.

25. The method of claim 18, wherein the initial privilege is recorded in the privilege list at a first time, and the current privilege is determined at a second time, the second time subsequent to the first time.

26. The method of claim 18, wherein the first token is an object having a specified structure that stores information describing privileges granted to the first process.

27. The method of claim 18, wherein a privilege comprises a privilege level.

* * * * *